Oct. 27, 1925.
J. O. CARREY
1,558,789
DISCHARGE AND CONTROL VALVE
Filed Dec. 8, 1924
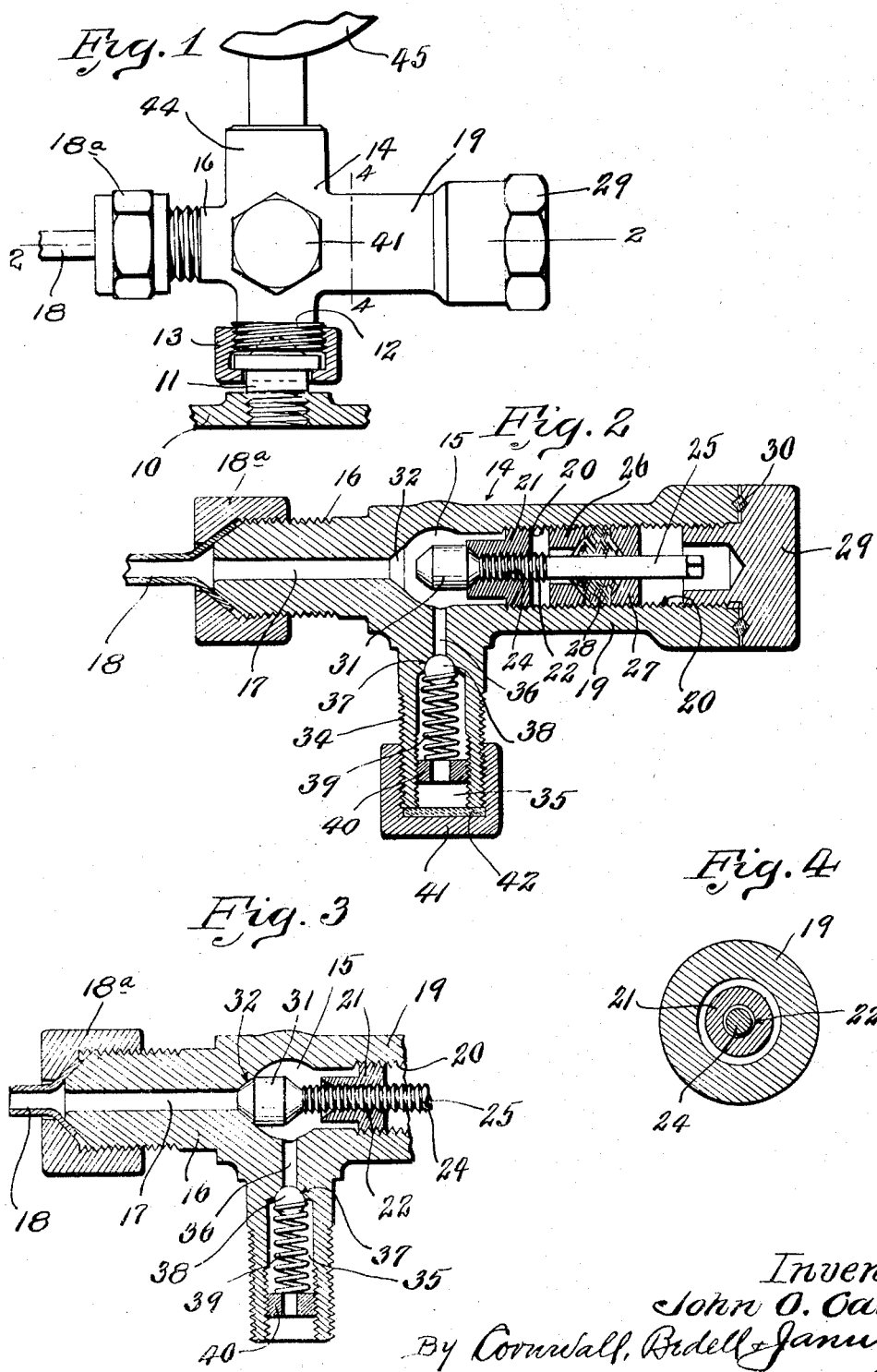
Inventor
John O. Carrey
By Cornwall, Ridell & Janus
Atty.

Patented Oct. 27, 1925.

1,558,789

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

DISCHARGE AND CONTROL VALVE.

Application filed December 8, 1924. Serial No. 754,581.

*To all whom it may concern:*

Be it known that I, JOHN O. CARREY, a citizen of the United States, residing at St. Louis, Missouri, have invented a certain new and useful Improvement in Discharge and Control Valves, of which the following is a specification, such as will enable others skilled in the art to which it appertains to make and use the same.

This invention relates to new and useful improvements in valve fittings for fluid pipe connections for compressors and the like, and the objects of the invention are to provide a valve fitting having a multiple of outlets controlled by suitable valves whereby certain of said outlets can be closed and opened at the will of the operator to facilitate the operation of the compressor or system with which such fitting is used.

Further objects of the invention are to provide a valve fitting having a valve for shutting off the system with which the compressor is connected and provided with a check valve operable to discharge air or other fluid from the compressor so as to create vacuum in said compressor whereupon said check valve can be permanently sealed and the first-mentioned valve opened so as to connect the compressor with the system.

With these and other objects in view, my invention consists in certain novel features of construction and arrangement of parts, hereinafter more fully described and claimed, and illustrated in the accompanying drawings, in which—

Figure 1 is a side elevational view of the valve fitting.

Figure 2 is a horizontal cross section taken on line 2—2 of Figure 1.

Figure 3 is a similar view showing the control valve moved to closing position and showing the check valve arranged to permit the discharge of air from the compressor to the atmosphere.

Figure 4 is a vertical cross section taken on lines 4—4 of Figure 1.

Referring by numerals to the accompanying drawings, 10 indicates a wall of the pressure chamber of a compressor and screw-seated in said wall is a member 11 of a union connection, the other member 12 of which is held to member 11 by a union 13. The threaded member 12 is formed integrally with and extends downwardly from a fitting 14 having a chamber 15 which is connected with the pressure chamber of the compressor by members 11 and 12.

Extending from fitting or bodyy portion 14 is a tubular portion 16 which is horizontally disposed and is provided with a longitudinal bore 17 communicating with chamber 15. Tubular portion 16 is adapted to be connected by means of member 18ª, which is screw-seated on the threaded portion of said tubular portion 16, to one end of a pipe 18, in the present instance, of a condenser of a refrigerating system. Coaxially aligned with tubular member 16 and extending in an opposite direction from body portion 14 is an extension 19 having a threaded bore 20 in which is screw-seated a valve seat member 21. This member 21 is provided with a threaded bore 22 for receiving the threaded portion 24 of a valve stem 25. Packing glands 26 and 27 are screw-seated in said bore 20 and force packing 28 into sealing engagement with the stem 25.

The outer end of extension 19 is closed by a plug 29 screw-seated in bore 20 and provided with a head having a circular groove which cooperates with a similar groove formed in the face of extension 19 to receive a suitable packing 30 of lead or other soft metal which, when plug 29 is screwed down tightly. completely fills said grooves and forms a fluid-tight seal. The inner end of stem 25 carries a valve 31 which, when said stem 25 is turned in the proper direction, is seated in a valve seat 32 formed in bore 17 at the point of junction thereof with the chamber 15, thus closing the communication between the compressor and the pipe connection 18.

Extending horizontally and preferably at right angles to tubular extensions 19 and 16 is an outlet member 34 having a large bore 35 terminating in the open end of said member and connected to chamber 15 through a reduced bore 36, there being a valve seat 37 formed at the junction of said bores. A ball valve 38 is held to seat 37 by a spring 39 which is arranged in bore 35 and is adjustable by means of an apertured collar 40 screw-seated in said bore. This ball valve constitutes a check valve which is used to permit the discharge of air from the compressor, thereby producing a vacuum therein for receiving the refrigerating fluid. When the check valve is not in operation, a cap 41 is screw-seated on the externally threaded end of outlet 34 and seals the open end of bore 35. This cap 41 is provided with a washer or lining 42 of lead or other suitable metal which, when the cap is screwed down tightly, engages the edge of outlet 34 and hermetically seals bore 35.

A tubular extension 44 extends upwardly from fitting 14 and is internally threaded for receiving the threaded stem of a pressure indicating or measuring device 45 by means of which the vacuum or pressure existing in the compressor and the system can be ascertained.

The construction of valve in accordance with my invention permits the charging and discharging of the compressor and the system independently of each other and the provision of a union connection allows the compressor to be disconnected and moved away without disturbing the remaining connections.

Obviously minor changes in the construction of my improved valve can be made without departing from the spirit of my invention.

I claim:

1. A valve fitting having an inlet extension and an outlet extension, a tubular member formed integral with said fitting in coaxial alignment with said outlet extension, a control valve, a stem therefor screw-seated in said tubular member and operable to seat said valve against said outlet extension, thereby closing the communication between the latter and said inlet extension, and a check valve arranged in the discharging portion of said fitting for permitting discharge of fluid from said fitting to the atmosphere.

2. A valve fitting having an inlet extension and an outlet extension, a tubular member formed integral with said fitting in coaxial alignment with said outlet extension, a control valve, a stem therefor screw-seated in said tubular member and operable to seat said valve against said outlet extension, thereby closing the communication between the latter and said inlet extension, a check valve arranged in the discharging portion of said fitting for permitting discharge of fluid from said fitting to the atmosphere, and a cap for hermetically sealing said discharge connection.

3. A valve fitting having an inlet extension and an outlet extension, a tubular member formed integral with said fitting in coaxial alignment with said outlet extension, a control valve, a stem therefor screw-seated in said tubular member and operable to seat said valve against said outlet extension, thereby closing the communication between the latter and said inlet extension, a check valve arranged in the discharging portion of said fitting for permitting discharge of fluid from said fitting to the atmosphere, and a screw-plug for closing access to said valve stem and sealing said valve extension to the atmosphere.

4. A valve fitting formed of a single piece and comprising a body portion provided with a chamber, an inlet portion adapted to be connected to the pressure side of a compressor and communicating with said chamber, an outlet extension adapted to be connected to the high pressure side of a fluid system and having a bore leading from said chamber, a tubular extension formed coaxially with said outlet extension, a valve stem adjustably screw-seated in said tubular extension, a valve carried by the inner end of said stem and adapted to be seated in a valve seat formed in the bore of said outlet extension thereby closing the communication therebetween and said chamber an upwardly presented extension for receiving a pressure indicating instrument, a discharge extension leading from said chamber, and a discharge check valve in said extension.

5. A valve fitting formed of a single piece and comprising a body portion provided with a chamber, an inlet portion adapted to be connected to the pressure side of a compressor and communicating with said chamber, an outlet extension adapted to be connected to the high pressure side of a fluid system and having a bore leading from said chamber, a tubular extension formed coaxially with said outlet extension, a valve stem adjustably screw-seated in said tubular extension, a valve carried by the inner end of said stem and adapted to be seated in a valve seat formed in the bore of said outlet extension thereby closing the communication therebetween and said chamber, an upwardly presented extension for receiving a pressure indicating instrument, a discharge extension leading from said chamber, a discharge check valve in said extension, and a removable cap on said discharge extension for hermetically sealing the communication therebetween and the atmosphere.

6. A valve fitting comprising a body member provided with a chamber and a plurality of tubular extensions, the bores of which open into said chamber, a union connection arranged in one of said extensions for facilitating the connection thereof to the compressor, the discharge extension being adapted to be connected to a suitable pipe for discharging the fluid thereinto, a control valve arranged in said valve fitting for controlling the communication between said chamber and said discharge extension, and a check valve in the other one of said extensions for permitting the discharge of fluid from the chamber to the atmosphere.

7. A valve fitting comprising a body member provided with a chamber and a plurality of tubular extensions, the bores of which open into said chamber, a union connection arranged in one of said extensions for facilitating the connection thereof to the compressor, the discharge extension being adapted to be connected to a suitable pipe for discharging the fluid thereinto, a control valve arranged in said valve fitting for controlling the communication between said chamber and said discharge extension, and a check valve in the other one of said extensions for permitting the discharge of fluid from the chamber to the atmosphere, and a cap for sealing said check valve extension.

In testimony whereof I hereunto affix my signature this 4th day of December, 1924.

JOHN O. CARREY.